United States Patent [19]

Leymann

[11] Patent Number: 4,619,427
[45] Date of Patent: Oct. 28, 1986

[54] STAND FOR DATA DISPLAY TERMINALS

[75] Inventor: Friedhelm Leymann, Langenhagen, Fed. Rep. of Germany

[73] Assignee: Heinrich Oelschlager Metallwarenfabrik, Fed. Rep. of Germany

[21] Appl. No.: 626,049

[22] Filed: Jun. 29, 1984

[51] Int. Cl.⁴ ............................................ F16M 11/04
[52] U.S. Cl. ...................................... 248/178; 108/92; 108/102; 248/657; 248/188.5
[58] Field of Search ............... 248/178, 177, 176, 180, 248/420, 188.5, 188.1, 188.4, 657, 128, 394, 395, 278, 244; 108/102, 106, 95, 92

[56] References Cited

U.S. PATENT DOCUMENTS

| | | | |
|---|---|---|---|
| 3,165,630 | 1/1965 | Bielat et al. | 108/102 |
| 3,834,657 | 9/1974 | Freitas | 248/657 |
| 3,915,102 | 10/1975 | Barron | 248/188.5 |
| 4,177,967 | 12/1979 | Marchus | 248/178 |
| 4,234,152 | 11/1980 | Browse | 248/415 |

FOREIGN PATENT DOCUMENTS

| | | |
|---|---|---|
| 3003017 | 7/1981 | Fed. Rep. of Germany . |
| 2333470 | 7/1977 | France ............................ 248/178 |

Primary Examiner—Ramon O. Ramirez
Attorney, Agent, or Firm—Allegretti, Newitt, Witcoff & McAndrews, Ltd.

[57] ABSTRACT

A stand for a display terminal and keyboard comprising a table-like plate for the terminal, titably mounted on a guide means, and a shelf for said keyboard which slides into and out of said guide means. The guide means is rotatably mounted on a carriage which rolls on a horizontal rail. The display terminal and the keyboard can be rotated in any direction and moved along the rail so that they are accessible to two users working beside the stand. Additionally, the keyboard may be moved independently toward and away from the display terminal to accommodate the user.

6 Claims, 1 Drawing Figure

U.S. Patent  Oct. 28, 1986  4,619,427
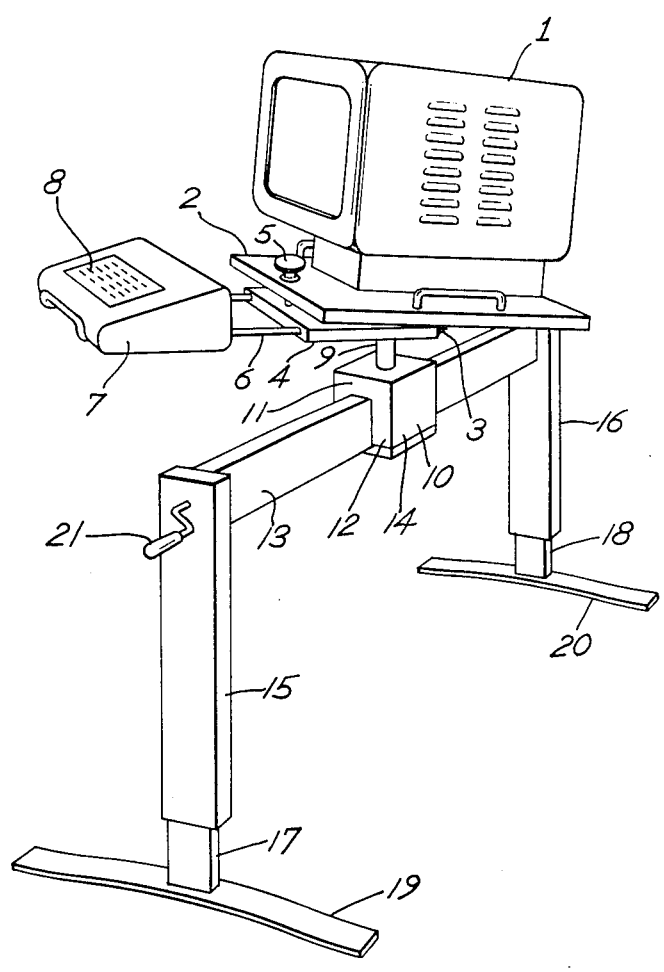

4,619,427

STAND FOR DATA DISPLAY TERMINALS

BACKGROUND OF THE INVENTION

The invention relates to a stand for cathode-raytube data display terminals or the like which make a single terminal readily accessible to users located in two or more work stations.

A typical adjustable stand for supporting pieces of equipment on a horizontal surface is disclosed in GE-GMS No. 82 11 397. That stand has a bottom plate movable on a supporting surface which carries a turntable and can be used only in connection with level supporting surfaces, such as tabletops or the like. Since the typical stands are placed on the top surface of a table or desk, the stand cannot be used independent of its supporting surface and takes up useful working space on the table or desk. Moreover, the direction of movement of the stand is not confined so that the stand, after moving back and forth several times, can leave the desired path of travel and, in extreme cases, even fall off the supporting surface.

SUMMARY OF THE INVENTION

It is an object of the invention to provide a stand for data display terminals or the like that carries the terminal in a precise, controlled path independently of supporting surfaces such as tabletops and desk tops.

In a preferred form of the invention, the stand is mounted on a rail having a sliding carriage which supports and guides the terminal without any element bearing on the desk or tabletop of the work station. Therefore, desk tops can be left clear. The path of movement is precisely defined, and since objects positioned on the desk or tabletop are no longer in the path of movement, easy mobility is assured at all times. This is of particular advantage when the movement of the data display terminal is from one position to an opposite position, so that work can be done with one unit from any of two or more work stations.

The ends of the rail can be supported in any way desired to allow for universal mobility. It is preferred that each end of the rail carrying the data display terminal is supported by a vertical leg constructed and arranged independently of the tables or desks of the work station. This allows for a broad choice of rail arrangements and desired paths of movement for the terminal. At the same time, the vertical legs can be adjustable for which a telescoping arrangement is particularly suitable.

In one embodiment of the invention, the carriage forms essentially a U-shaped member aligned transversely to the longitudinal axis of the rail. The legs of the carriage grip the sides of the rail so that a controlled guidance is assured along the longitudinal axis of the rail. In order to prevent unforeseen tilting, it is desirable that the carriage or slide have fingers or flanges attached to the ends of the legs and bearing against the underside of the rail. These fingers or flanges are not loaded normally and can be simply safety flanges or safety fingers. The bearing surfaces of a sliding carriage, in a manner known to those skilled in the art, are made of a material that facilitates a sliding movement. One such example is plastic which requires no lubrication. Alternatively, the carriage may have wheels or rollers which ride on the rail to aid ease of movement.

BRIEF DESCRIPTION OF THE DRAWING

The single FIGURE is a perspective view of one embodiment of the invention.

DETAILED DESCRIPTION OF THE PREFERRED EMBODIMENT

Referring to the drawing, a stand for a data display terminal 1 is shown. The data display terminal 1 is mounted on a plate support 2 that by means of a horizontal shaft 3 is hinged to an auxiliary support 4. The data display terminal 1 is adjustable in inclination by means of a finger or thumb screw 5 which is screwed into the plate support 2 and bears against the auxiliary support 4 at its lower end. By turning the finger or thumb screw 5, the front portions of the plate support 2 and attached data display terminal 1 are moved upward or downward in relation to the auxiliary support 4. The auxiliary support 4 constitutes the fixed part of a guide, the movable part of which consists of a pair of arms 6 carrying an auxiliary shelf 7 on which a keyboard 8 is secured. The arms 6 slide into slots in auxiliary support 4.

The auxiliary support 4 is mounted on a rotatable vertical shaft 9 which in turn is mounted in a bearing in the top of a carriage 10. The carriage 10 is essentially U-shaped, with its cross part 11 and its legs 12 gripping a rail 13, and is guided on or against the rail by means of rollers that are arranged inside the carriage 10 and are therefore not visible. Secured to the lower end of the legs 12 is a plate 14 which bears against the underside of the rail 13 to keep the carriage 10 from tilting.

The ends of rail 13 are fastened to and supported by the upper ends of telescoping, vertically adjustable legs 15, 16, whose lower extendable parts 17, 18 have crosspieces 19, 20. The vertical adjustment of the legs 15, 16, and thus the height of adjustment of the data display terminal, is made with a handle 21 which actuates an internal drive not visible in the drawing.

What I claim is:

1. A stand for a display terminal comprising a plate supporting said terminal,
  a carriage having an inverted U-shape with a lower end and supporting said plate,
  a horizontally disposed rail, said carriage fitting over the top of the rail and being supported on and held against lateral tilting by the rail for horizontal movement on the rail and
  a bearing plate secured to the lower end of said carriage, and bearing plate positioned against the underside of the rail to further prevent the carriage from tilting.

2. The stand of claim 1 which includes legs for supporting said rail.

3. The stand of claim 2 in which said legs are adjustable.

4. The stand of claim 2 in which said legs are telescopic.

5. A stand for a display terminal comprising a plate supporting said terminal,
  a carriage having an inverted U-shape with a lower end and supporting said plate,
  a horizontally disposed rail, said carriage fitting over the top of the rail and supported on said held against lateral tilting by the rail for horizontal movement on the rail,
  a vertical shaft rotably mounted upon said carriage, and an auxiliary support secured to the top of the vertical shaft, an auxiliary shelf which slides in and out of said auxiliary support, and a horizontal shaft hinging said plate to said auxiliary support whereby the plate can be tilted about said horizontal shaft.

6. The stand of claim 5 which includes a thumb screw extending through a threaded opening in said plate, the lower end of which abuts said auxiliary support for adjusting the tilting position of the plate.

* * * * *

UNITED STATES PATENT AND TRADEMARK OFFICE
CERTIFICATE OF CORRECTION

PATENT NO. : 4,619,427
DATED : October 28, 1986
INVENTOR(S) : Friedhelm Leymann

It is certified that error appears in the above-identified patent and that said Letters Patent is hereby corrected as shown below:

In the Abstract, line 2, delete "titably" and substitute --tiltably--.

Signed and Sealed this

Twenty-seventh Day of January, 1987

Attest:

DONALD J. QUIGG

Attesting Officer     Commissioner of Patents and Trademarks